Oct. 7, 1969
C. G. CARTER ETAL
3,470,830
APPARATUS FOR PREPARING FRENCH FRIED POTATOES
Filed June 21, 1966
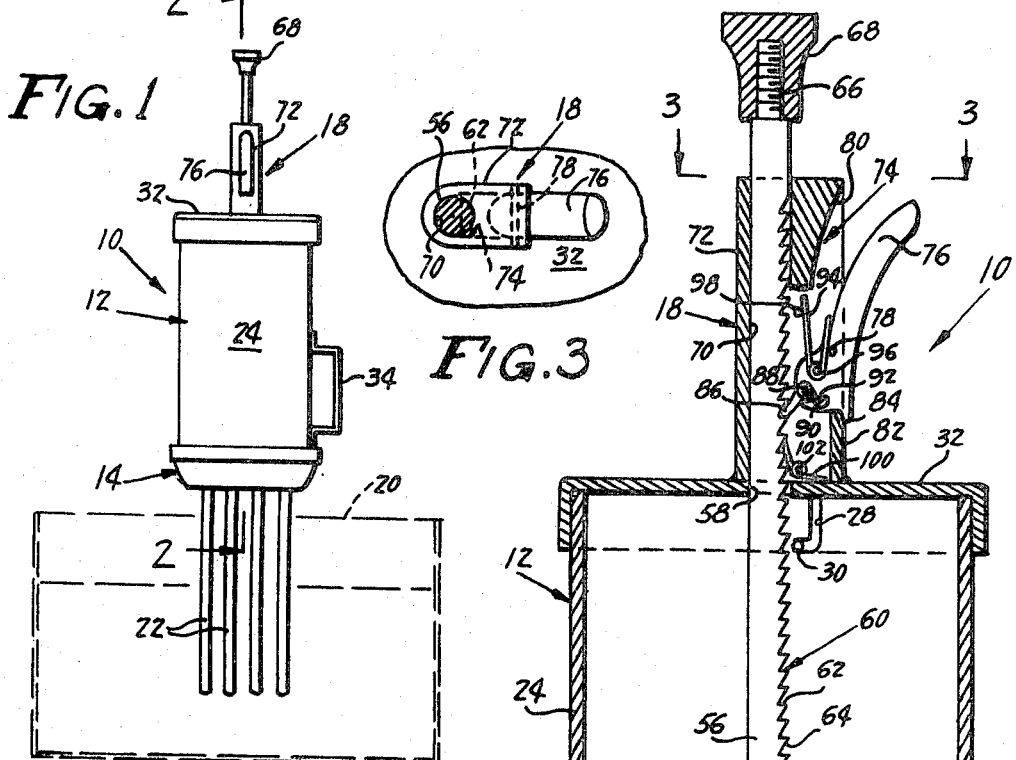
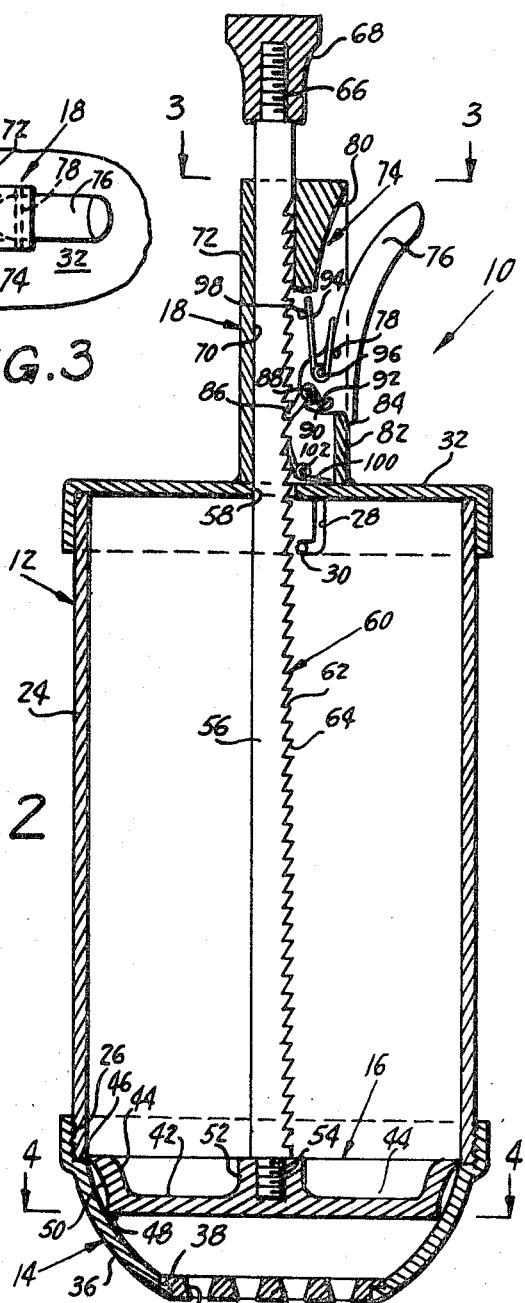
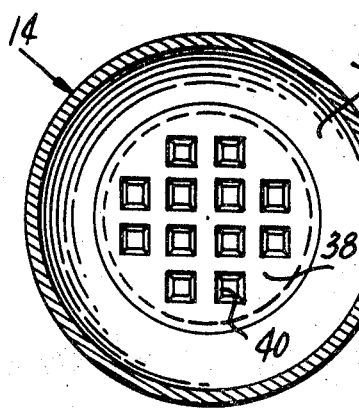
INVENTORS.
CHARLES G. CARTER
MARVIN G. REYNOLDS
BY *Kimmel, Crowell & Weaver*
ATTORNEYS.

United States Patent Office 3,470,830
Patented Oct. 7, 1969

3,470,830
APPARATUS FOR PREPARING FRENCH FRIED POTATOES
Charles G. Carter, Rte. 10, Dick Ford Lane, Knoxville, Tenn. 37920, and Marvin G. Reynolds, Rte. 2, Powell, Tenn. 37849
Filed June 21, 1966, Ser. No. 559,288
Int. Cl. A21c *11/16;* B29f *3/00*
U.S. Cl. 107—14    9 Claims

ABSTRACT OF THE DISCLOSURE

An apparatus for producing French fried potatoes by extruding a batter through an apertured wall with the wall having a substantially smaller cross section than the cross sectional area of the reservoir.

---

This invention relates to an apparatus for preparing French fried potatoes, and more particularly to extruding a sufficient number of potato batter strips to constitute a single serving of French fried potatoes by the operation of the operating handle of the dispenser of the instant invention through a single operative cycle.

As exemplified by United States Patents Nos. 3,085,020 and 3,109,739, it is known to the prior art to prepare a potato batter from either raw or dehydrated potatoes to which various components may be added to improve the texture, color and flavor of the resulting French fried potatoes. While both of these patents contemplate the extrusion of the potato batter in order to form the potato srips in preparation for frying, it appears that both of the patents are directed to a large scale food processing operation, such as the manufacture of large quantities of partially cooked potato strips which will be vended either directly to consumers or through restaurants or the like. Extrusion machines are known to the prior art for forming potato batter strips of predetermined length as exemplified by United States Patent No. 3,215,094. Like the previously mentioned patents, this device appears to be directed to a device for manufacturing large quantities of partially cooked French fried potatoes which will be vended in a frozen state.

The instant invention comprises an apparatus for extruding potato batter strips in relatively small quantities sufficient to constitute a single serving. It is contemplated that a dry potato mix will be delivered to restaurants and the like where the potato batter will be prepared, although it should be understood that a premixed batter could be delivered to the restaurant for use. When a customer orders a serving of French fried potatoes, teh cook uses the device of the instant invention to deliver a sufficient number of potato strips preferably directly into a deep fat fryer or the like. After the potatoes have been removed from the fryer and drained, they will be served directly to the consumer.

One difficulty in devising a dispenser of the character contemplated is the requirement for substantially uniform lengths of French fried potatoes. As contrasted with the cutting knife of United States Patent No. 3,215,094, the dispensing device of the instant invention is arranged such that the potato strips will be severed from the remaining potato batter by the forces necessary to extrude the batter from the dispensing device. This is accomplished by a particular arrangement of the dispensing elements of the instant invention, in particular the movable piston which is provided for forcing the batter through an apertured wall.

Another difficulty to be overcome in the construction of a device of the character contemplated is the need for some means of cost and quality control built directly into the operation of the dispenser. To solve this difficulty, the device of the instant invention is characterized by an operating handle which is manipulated by the cook to deliver a sufficient number of potato batter strips upon one complete cycle of operation of the operating handle.

In brief terms, the instant invention is used by placing a potato batter in a dispensing device and manipulating the operating handle one cycle to deliver a sufficient number of potato batter strips from the dispensing device to constitute a single serving of French fried potatoes. The device of the instant invention is characterized by a batter-filled reservoir, a movable piston having the head thereof configured to result in the severing of the potato batter strips as they exit through the apertured wall. This is accomplished by placing the lowermost edge of the piston away from the interior reservoir wall while the upper edge of the piston acts as a seal in engagement with the reservoir interior wall. Another aspect of the instant invention resides in the provision of means for incrementally advancing the piston a predetermined distance to extrude potato strips of a desired and uniform length.

The primary object of the instant invention is the provision of a dispensing device forming potato strips of a predetermined number and of uniform lengths to provide restaurants and the like a convenient and rapid means of preparing and serving French fried potatoes to customers.

Another object of the instant invention is to provide a device for dispensing potato batter strips at such a force that upon cessation of the extrusion process the strips break adjacent the extrusion orifices to form strips of uniform length.

Still another object of the instant invention is to provide a device for dispensing potato batter strips in which the force transmitting piston is positively moved toward the extrusion orifices and held against rebound to facilitate the severance of the potato batter strips at a point adjacent the extrusion orifices.

A further object of the instant invention is to provide a device of the character described in which a piston forces the potato batter through a plurality of extrusion orifices, the piston being shaped to facilitate the breaking of the strips at a point adjacent the extrusion orifices to create strips of uniform length.

A still further object of the instant invention is to provide a dispensing device of the character described in which the extrusion orifices are of decreasing cross-sectional area to facilitate the formation of uniform length strips.

Another object of the instant invention is to provide a potato batter dispensing device which is arranged and constructed to use a potato batter mix made from dehydrated potatoes.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this inventive concept.

In the drawing:

FIGURE 1 is a front elevational view of a potato batter dispensing device made in accordance with the principles of the instant invention illustrating a plurality of potato batter strips being extruded into a deep fat fryer shown in dashed lines;

FIGURE 2 is a longitudinal cross-sectional view of the device of FIGURE 1 taken substantially along line 2—2 thereof as viewed in the direction indicated by the arrows, illustrating the force transmitting piston at the completion of its path of travel;

FIGURE 3 is a partial transverse cross-sectional view of the device of FIGURES 1 and 2, taken substantially along line 3—3 of FIGURE 2 as shown in the direction indicated by the arrows, illustrating a top view of the operating handle; and FIGURE 4 is a transverse cross-sectional view of the dispensing device of FIGURES 1 and 2, taken substantially along line 4—4 thereof as viewed in the direction indicated by the arrows, illustrating the extrusion orifices.

Referring now to the drawing in detail, wherein like reference characers designate like elements tthroughout the several views thereof, the dispensing device of the instant invention is illustrated generally at 10 having as its major components a reservoir shown generally at 12 for receiving a charge of potato batter, a dispensing head designated generally at 14, a piston denominated generally at 16 mounted for movement within reservoir 12 for forcing potato strips through dispensing head 14 and an actuator illustrated generally at 18 for advancing piston 16 at the command of an operator. As will become evident as the description of the instant invention proceeds, the operator places a charge of potato batter within reservoir 12 preferably at the start of the working day to expedite the handling of orders for French fried potatoes during the busy part of the day. When an order for French fried potatoes is received, the operator will remove device 10 from its temporary storage location, preferably a refrigerator or the like for preserving the mixed batter, position reservoir 12 vertically above a deep fat fryer 20 or other suitable frying apparatus, and manipulate actuator 18 a single cycle to deliver a plurality of potato strips 22 through dispensing head 14 into fryer 20. Because of the nature and arrangement of the device of the instant invention, strips 22 break off immediately adjacent dispensing head 14 to form substantially uniform lengths of potato batter which are cooked in fryer 20. After the cooking process is complete, the operator will remove strips 22 in a conventional manner, allow them to drain, and serve them directly to the customer.

As shown best in FIGURE 2, reservoir 12 is illustrated as including a closed wall 24 configured as a cylinder, although it should be understood that reservoir 12 may be of any shape convenient to allow the passage of piston 16. The lower end of cylinder 24 is provided with a plurality of external threads 26 mating with similar interior threads on dispensing head 14. The upper end of reservoir 12 forms a plurality of J-shaped bayonet slots 28 each of which receive a pin 30 on a closure cap 32. It should be understood, however, that any suitable type of connection may be formed between cylinder 24 and cap 32, the illustrated connection being preferred for ease of disassembly. As shown in FIGURE 1, cylinder 24 carries a U-shaped handle 34 to allow an individual to hold dispenser 10 over fryer 20 in a convenient and expeditious manner.

Dispensing head 14 includes a truncated spherical wall 36 having a maximum internal diameter substantially equal to the internal diameter of cylinder 24 and forms a series of internal threads mating with external threads 26 formed on cylinder 24. As will be seen most clearly in FIGURE 2, the spherical nature of wall 36 precludes cylinder 16 from passing throughout the depth of dispensing head 14. Head 14 also includes a planar bottom wall 38 secured by spherical wall 36 at right angles to the direction of movement of piston 16. Wall 30 forms a plurality of orifices 40 which, as shown in FIGURES 2 and 4, are of decreasing cross-sectional area as viewed in the direction of movement of piston 16. Illustratively, orifices 40 are illustrated as having a square cross-sectional configuration, although it should be understood that other configurations may be used to vary the exterior shape of the ultimate French fried potato. Orifices 40 are preferably shaped as shown to facilitate the passage of batter through wall 38 in a rapid and expeditious manner.

An important feature of dispenser 10 is the ability to dispense a sufficient number of potato strips to constitute a single serving, which is normally between ten and forty french fries and which is preferably about twenty. Although plate 38 is illustrated as having ten orifices 40, it should be understood that the drawing is for purposes of explanation only. Plate 38 is formed with a sufficient number of extrusion orifices to form the desired number of potato strips with a single cycle of operation of actuator 18. Accordingly, wall 38 is made having between ten and forty apertures and preferably about twenty.

Before explaining the exact configuration of piston 16, it is believed that a short discussion of a development of piston 16 is in order. When the inventors started using a piston moving through a cylinder to extrude potato strips, a flat bottomed piston coextensive with the side walls of the cylinder was used, similar to the devices shown in United States Patents Nos. 2,634,692; 2,670,881 and 2,927,543. It was found that the strips extruded through dispensing head 14 would not break off adjacent orifices 40 in a uniform manner but would either break off at some point between the end of strip 22 and the dispensing head 14 or not break off at all. After some experimentation with the potato batter, it was decided to alter the shape of piston 16 to determine if any advantageous results would accrue therefrom.

Piston 16 was placed on a lathe and, quite inadvertently, a gouge was made in the circumferential wall thereof. Rather than discard the experimental piston, it was placed in dispenser 10 and an extrusion process attempted. Much to the surprise and satisfaction of the inventors, the majority of potato strips extruding from the device broke off immediately adjacent orifices 40. Piston 16 was removed from dispenser 10 and additional material was cut from the circumferential wall thereof forming piston 16 in the configuration shown in FIGURE 2. An additional extrusion operation was attempted with all of strips 22 breaking off immediately adjacent apertures 40. After it was determined that the configuration of piston 16 affected the severance of the potato strips from the batter, some experimentation was performed on the shape of extrusion head 14. After attempting various shapes of heads, including the substantially flat head shown in the aforementioned patents, the decreasing cross-sectional area of head 14 was found most effective in providing uniform lengths of potato strips.

Although it is not completely understood why the shape of piston 16 contributes so greatly to the severance of potato strips 22 immediately adjacent orifices 40, it is surmised that the gap produced between piston 16 and cylindrical wall 24 acts as a cushion to halt the extrusion of strips 22 through orifices 40 as soon as the movement of piston 16 is stopped. Prior to the shaping of piston 16 in the manner shown, a certain amount of oozing of the potato batter through orifices 40 occurred after piston 16 had ceased moving.

Piston 16 includes a planar bottom wall 42 having an upstanding flange 44 adjacent cylindrical wall 24 forming an upper lip 46 in substantial sealing engagement with the interior of cylinder 24. The lower edge 48 of piston 16 is spaced away from wall 24 to form a gap between the lowermost portion of piston 16 and cylindrical wall 24. In addition, a circumferential wall 50 of piston 16 is diverging away from cylindrical wall 24 and is preferably concave toward wall 24. The central portion of cylinder 16 includes a hub 52 forming an internally threaded upwardly facing opening 54 threadably receiving the lower end of a rod 56.

Rod 56 comprises a portion of actuator 18 and is preferably cylindrical in cross-sectional configuration as shown in FIGURE 3 for purposes more fully explained hereinafter. Rod 56 extends through an opening 58 in closure cap 32 and is mounted for reciprocable and rotary movement. A plurality of vertically spaced teeth shown generally at 60 are formed on one side of rod 54 and include a substantially horizontal portion 62 underlying an inwardly extending diagonal portion 64 in a conventional configuration. The upper end 66 of rod 56 is threaded and receives an interiorly threaded knob 68 for rotating and/or removing rod 56 and piston 16 for purposes more fully explained hereinafter.

Rod 56 extends through a passageway 70 formed in a support 72 perpendicularly secured to cap 32. Support 72 also forms a groove shown generally at 74 communicating between passageway 70 and the exterior of support 72. An operating handle 76 is pivotally mounted by a pin 78 extending across groove 74 for movement between a first position shown in FIGURE 2 and a second position in which the upper convex surface of handle 76 resides against a stop 80 formed as a part of groove 74. Another stop 82 is part of support 72 and extends upwardly under handle 76 to abut a protuberance 84 on handle 76. Because of the provision of stops 80, 82 and the configuration of handle 76, it will be evident that the arc of rotation of handle 76 is strictly confined.

Handle 76 carries a pawl 86 mounted by a pin 88 for pivotal movement about the axis thereof with a coiled spring 90 abutting a stationary pin 92 on handle 76 to bias pawl 86 in the direction shown by the arrow in FIGURE 2. A second coil spring 94 is secured by a pin 96 to handle 76 and abuts a pin 98 extending across slot 74 with the upper end of spring 94 contacting handle 76 above pivot pin 78 to bias handle 76 toward the first position shown in FIGURE 2.

At the start of the extrusion operation, handle 76 will be in the position illustrated in FIGURE 2 under the biasing influence of spring 94. When the operator desires to extrude a plurality of potato strips 22 into fryer 20, handle 34 will be grasped by the individual with one hand and handle 76 pressed against support 72 with the other hand. The depression of handle 76 will rotate pawl 86 thereby depressing the tooth associated with pawl 86. The depression of a single tooth of rod 56 will, of course, depress piston 16 and extrude strips 22 through orifices 40. Because pawl 86 is pivoting away from engagement with teeth 60, pawl 86 will disengage the associated tooth slightly before handle 76 strikes stop 80. When the operator releases handle 76 at the termination of the extrusion process, spring 94 will return handle 76 to the starting point shown in FIGURE 2. An important feature of actuator 18 is that a specified number of teeth 60 are depressed with each manipulation of operating handle 76. In a preferred embodiment, pawl 86 contacts each successive tooth 60 and depresses each tooth upon a single movement of handle 76. In this manner it will be readily apparent that the movement of piston 16 through reservoir 12 is a controlled incremental advancement thereby resulting in potato strips of substantially uniform length.

Because the potato batter in reservoir 12 is being compressed during the advancement of piston 16, there is some tendency for piston 16 and piston rod 56 to rebound after pawl 86 disengages tooth 60. To overcome this difficulty, a spring 100 is mounted by a pin 102 extending across the lower end of groove 76 into the sides of support 72 with the upper end of the spring overlying horizontal portion 62 of a particular tooth 60. Spring 100 is preferably coiled about pin 102 and has an upper U-shaped end lying over horizontal portion 62. It will be readily apparent that spring 100 is positioned such that it engages tooth 60 approximately the same time that pawl 86 disengages the tooth being depressed.

After the charge of potato batter within reservoir 12 has been exhausted, as is the situation shown in FIGURE 2, it is necessary to remove cap 32, retract piston rod 56, clean dispenser 10, and refill reservoir 12 with a charge of potato batter. It will be readily apparent that cap 32 may be removed from cylinder 24 by rotating the cap to disengage pin 30 from bayonet slot 28. In order to disengage pawl 86 and spring 100 from engagement with teeth 60, knob 68 is rotated with respect to support 72 thereby rotating piston rod 56. The rotation of piston rod 56 acts to slide teeth 60 out of engagement with pawl 86 and spring 100 thereby freeing piston rod 56 for free reciprocable movement through passageway 70.

It should be readily apparent that a plurality of potato batter compositions may be used with the method and apparatus of the instant invention. In particular, the compositions discussed in United States Patents Nos. 3,085,020 and 3,109,739 are acceptable. It is preferred, however, to provide a packaged dry potato mix to a restaurant or the like, in the ratio of one pound of powdered dehydrated potatoes to one and three-quarter ounces of powdered egg whites and two and one-half ounces of edible starch. Immediately prior to filling reservoir 12, water in the amount of two and one-half times the volume of the dry potato mix is added thereto and thoroughly agitated in a conventional manner. The volumetric capacity of reservoir 12 is preferably rather large to accommodate a batter sufficient to produce a considerable number of servings balanced against the weight of dispenser 10 and the storage characteristics of the prepared batter as well as the requirements of the restaurant. It has been found that the dry potato mix previously mentioned has a shelf life of sufficient duration as to avoid handling problems. When refrigerated, the prepared batter has a shelf life of approximately 72 hours. It has accordingly been found that the construction of reservoir 12 of sufficient capacity to hold batter sufficient for about 80 servings is preferred, although this number may vary considerably under the circumstances.

It is now seen that there is herein provided an improved apparatus for preparing French fried potatoes which accomplishes all of the objects and advantages of the instant invention and others, including means advantages of great practical utility and commercial importance.

We claim:

1. A device for dispensing potato batter strips of uniform length in the making of French fried potatoes comprising:
   a reservoir for the batter having an apertured wall for dispensing the strips;
   a piston movable through the reservoir toward the apertured wall for forcing the batter therethrough, the circumferential wall of the piston having an uppermost lip in substantial sealing engagement with the reservoir interior wall and a lowermost edge spaced away from the reservoir interior wall to form a gap between the piston and the interior reservoir wall;
   means for advancing the piston toward the apertured wall;
   said apertured wall being of smaller cross-sectional area than the cross-sectional area of the reservoir; and further including an adaptor wall connecting the apertured wall to the reservoir and defining a chamber of decreasing cross-sectional area from the reservoir to the apertured wall.

2. The strip dispensing device of claim 1 wherein the adaptor wall is of truncated spherical configuration.

3. The strip dispensing device of claim 1 wherein the apertured bottom wall has between ten and fifty extrusion orifices to dispense sufficient potato strips to constitute a single serving of French fried potatoes.

4. The strip dispensing device of claim 3 wherein the apertured bottom wall has about twenty extrusion orifices.

5. The strip dispensing device of claim 1 further including means positively holding the piston in each position of its incremental movement.

6. The dispensing device of claim 1 wherein the advancing means includes
   a rod, connected at one end to the piston, extending through one wall of the reservoir;
   a handle, mounted on the device, for movement between a first and a second position, engaging the piston rod during movement from the first position to the second position for depressing the rod and extruding batter through the orifices;

a stop contacting the handle at the first position for preventing overshifting thereof;

means precluding the handle from driving the rod more than a predetermined uniform distance with each movement of the handle; and means biasing the handle toward the stop for returning the handle to the first position after the completion of a half circle of movement thereof.

7. The strip dispensing device of claim 6 further including means holding the piston rod in position when the the handle moves from the second position to the first position.

8. The strip dispensing device of claim 6 wherein
the piston rod forms a plurality of vertically spaced teeth; and
the precluding means includes a pawl pivotally mounted on the handle biased toward the piston rod for engagement with the teeth thereof, the pawl being arranged to disengage the teeth a predetermined distance from the first position.

9. The strip dispensing device of claim 8 further including an abutment, mounted on the device for movement toward the piston rod, for engagement with the teeth thereof holding the rod against movement when the handle moves from the second position to the first position.

References Cited

UNITED STATES PATENTS

| 146,076 | 12/1873 | Kaskel. | |
|---|---|---|---|
| 1,397,510 | 11/1921 | Grassi | 107—52 |
| 2,655,877 | 10/1953 | Wilson | 107—47 |
| 2,670,881 | 3/1954 | Sjoblom | 107—52 X |
| 3,344,752 | 10/1967 | Ilines. | |

FOREIGN PATENTS 438,232  8/1948  Italy.

ROBERT W. JENKINS, Primary Examiner

R. I. SMITH, Assistant Examiner

U.S. Cl. X.R.

18—12